US009237110B2

(12) United States Patent
DeCusatis et al.

(10) Patent No.: US 9,237,110 B2
(45) Date of Patent: *Jan. 12, 2016

(54) DYNAMIC MAXIMUM TRANSMISSION UNIT SIZE ADAPTION (71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,181

(22) Filed: Sep. 30, 2014

(65) Prior Publication Data
US 2015/0055480 A1 Feb. 26, 2015

Related U.S. Application Data (63) Continuation of application No. 13/833,977, filed on Mar. 15, 2013.

(51) Int. Cl.
*H04L 12/805* (2013.01)
*H04L 29/06* (2006.01)
*H04L 12/26* (2006.01)
*H04L 12/715* (2013.01)
*H04L 12/721* (2013.01)
*H04L 12/801* (2013.01)

(52) U.S. Cl.
CPC .............. *H04L 47/365* (2013.01); *H04L 43/10* (2013.01); *H04L 45/64* (2013.01); *H04L 45/70* (2013.01); *H04L 47/12* (2013.01); *H04L 47/36* (2013.01); *H04L 69/166* (2013.01)

(58) Field of Classification Search
None
See application file for complete search history.

(56) References Cited

U.S. PATENT DOCUMENTS

| 5,425,023 | A | * | 6/1995 | Haraguchi et al. ............ 370/400 |
| 5,892,753 | A | * | 4/1999 | Badt et al. ..................... 370/233 |
| 6,570,849 | B1 | | 5/2003 | Skemer et al. |
| 7,969,876 | B2 | | 6/2011 | Samuels et al. |
| 8,064,345 | B2 | | 11/2011 | Griffoul |

(Continued)

OTHER PUBLICATIONS

"Software Defined Networking," IBM Systems and Technology Thought Leadership White Paper, Oct. 2012, Retrieved from the Internet: http://public.dhe.ibm.com/common/ssi/ecm/en/qcw03016usen/ on Feb. 6, 2013, 6 pages.

(Continued)

*Primary Examiner* — Faruk Hamza
*Assistant Examiner* — Andrew Oh
(74) *Attorney, Agent, or Firm* — Cantor Colburn LLP; Steven Chiu (57) ABSTRACT

An aspect includes dynamically adapting a maximum transmission unit (MTU) size in a computer network. A packet is received at a first link of a switch of the computer network. An MTU size of the received packet is determined based on an application programming interface (API) crossing value associated with the first link of the switch. An associated destination MTU size of a second link of the switch is determined as a target destination of the received packet. The associated destination MTU size of the second link is adjusted based on a difference between the MTU size of the received packet and the associated destination MTU size of the second link.

17 Claims, 6 Drawing Sheets

(56) References Cited

U.S. PATENT DOCUMENTS

| | | |
|---|---|---|
| 8,098,688 B1 | 1/2012 | Jaladanki et al. |
| 2004/0090922 A1* | 5/2004 | Jason et al. .................... 370/252 |
| 2005/0058131 A1* | 3/2005 | Samuels et al. ............... 370/389 |
| 2007/0211723 A1* | 9/2007 | Patel et al. .................... 370/392 |
| 2008/0101237 A1* | 5/2008 | Ogura et al. ................... 370/235 |
| 2008/0159150 A1* | 7/2008 | Ansari ........................... 370/238 |
| 2008/0298376 A1* | 12/2008 | Takeda et al. ................. 370/400 |
| 2009/0303947 A1* | 12/2009 | Karino et al. .................. 370/329 |
| 2010/0183024 A1 | 7/2010 | Gupta |
| 2010/0322249 A1* | 12/2010 | Thathapudi et al. ....... 370/395.1 |
| 2011/0216669 A1 | 9/2011 | Chawla et al. |
| 2011/0222557 A1 | 9/2011 | Starks et al. |
| 2011/0305143 A1 | 12/2011 | Gray et al. |
| 2011/0321039 A1 | 12/2011 | Deleon, III et al. |
| 2012/0051236 A1* | 3/2012 | Hegde et al. .................. 370/252 |

OTHER PUBLICATIONS

M. Behnam, et al., (2011) "Analysis and Optimization of the MTU in Real-Time Communications over Switched Ethernet," 2011 IEEE 16th Conference on Emerging Technologies & Factory Automation (ETFA), 7 pages.

M. Mathis, et al., (2007) "Packetization Layer Path MTU Discovery (RFC4821)," IP.com No. ICOM000148763D, Mar. 1, 2007, 34 pages.

N. McKeown, et al., "OpenFlow: Enabling Innovation in Campus Networks," Mar. 14, 2008, Retrived from the Internet: http://www.openflow.org on Jan. 29, 2013, 6 pages.

OpenFlow Switch Specification, Version 1.1.0 Implemented (Wire Protocol 0x02), Feb. 28, 2011, Retrieved from the internet: http://www.openflow.org on Jan. 29, 2013, 56 pages.

* cited by examiner

DYNAMIC MAXIMUM TRANSMISSION UNIT SIZE ADAPTION

DOMESTIC PRIORITY

This application is a continuation of U.S. application Ser. No. 13/833,977 filed Mar. 15, 2013, the disclosure of which is incorporated by reference herein in its entirety.

BACKGROUND

The present invention relates to computer networks and, more specifically, to dynamically adapting a maximum transmission unit size in a computer network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE). Various applications can employ different protocols for different purposes.

Various Ethernet protocols used in a network typically encapsulate data using a common Ethernet frame size. A maximum transmission unit (MTU) size is defined as the largest data unit that the network can transmit. A larger MTU brings greater efficiency because each packet carries more user data while protocol overhead, such as headers or underlying per-packet delays, remain fixed. This results in a higher efficiency, creating an improvement in bulk protocol throughput. A larger MTU also results in processing of fewer packets for the same amount of data. In some systems, such as hybrid architectures, per-packet-processing can be a critical performance limitation. However, using the largest possible MTU can also be problematic. For instance, large packets can occupy a slow link for a longer time period, causing greater delays to following packets while increasing lag and minimum latency. As an example, a 1500-byte packet, the largest allowed by Ethernet at the network layer, ties up a typical 14 kbps modem link for about one second. Large packets are also problematic in the presence of communication errors. Corruption of a single bit in a packet requires that the entire packet be retransmitted. At a given bit-error rate larger packets are more likely to be corrupted. Retransmissions of larger packets take longer, which can reduce overall system throughput.

SUMMARY

According to an aspect of the present invention, a method for dynamically adapting a maximum transmission unit (MTU) size in a computer network is provided. A packet is received at a first link of a switch of the computer network. An MTU size of the received packet is determined based on an application programming interface (API) crossing value associated with the first link of the switch. An associated destination MTU size of a second link of the switch is determined as a target destination of the received packet. The associated destination MTU size of the second link is adjusted based on a difference between the MTU size of the received packet and the associated destination MTU size of the second link.

According to a further aspect of the present invention, a computer program product for dynamically adapting a maximum transmission unit size in a computer network is provided. The computer program product includes a tangible storage medium readable by a processing circuit and storing instructions for execution by the processing circuit for performing a method. The method includes receiving a packet at a first link of a switch of the computer network. An MTU size of the received packet is determined based on an application programming interface (API) crossing value associated with the first link of the switch. An associated destination MTU size of a second link of the switch is determined as a target destination of the received packet. The associated destination MTU size of the second link is adjusted based on a difference between the MTU size of the received packet and the associated destination MTU size of the second link.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to adaptively matching different maximum transmission unit (MTU) sizes for different types of network protocols with different message sizes. MTU size may be monitored and adjusted at one or more network switches on a packet basis. Time division multiplexing can be used per link to vary MTU sizes for the same link over a period of time. Packet size and network link performance can be used to estimate and adjust MTU size per link for a plurality of network switches.

In an exemplary embodiment, switches in a network are under the control of a central software-defined network (SDN) controller. An SDN is a form of network virtualization in which the control plane is separated from the data plane in the network and implemented in a software application. This architecture allows network administrators to have programmable central control of network traffic without requiring physical access to hardware devices of the network. OpenFlow is an example of an enabler of SDN that gives access to the forwarding plane of a network switch or router over the network. The central SDN controller can receive messages from all of the switches in the network and provide instructions to each switch regarding the creation of virtual queues and the routing of packet traffic. The central SDN controller overlooks an entire network and may activate a selection of switches at a particular moment in time.

Figure 1:
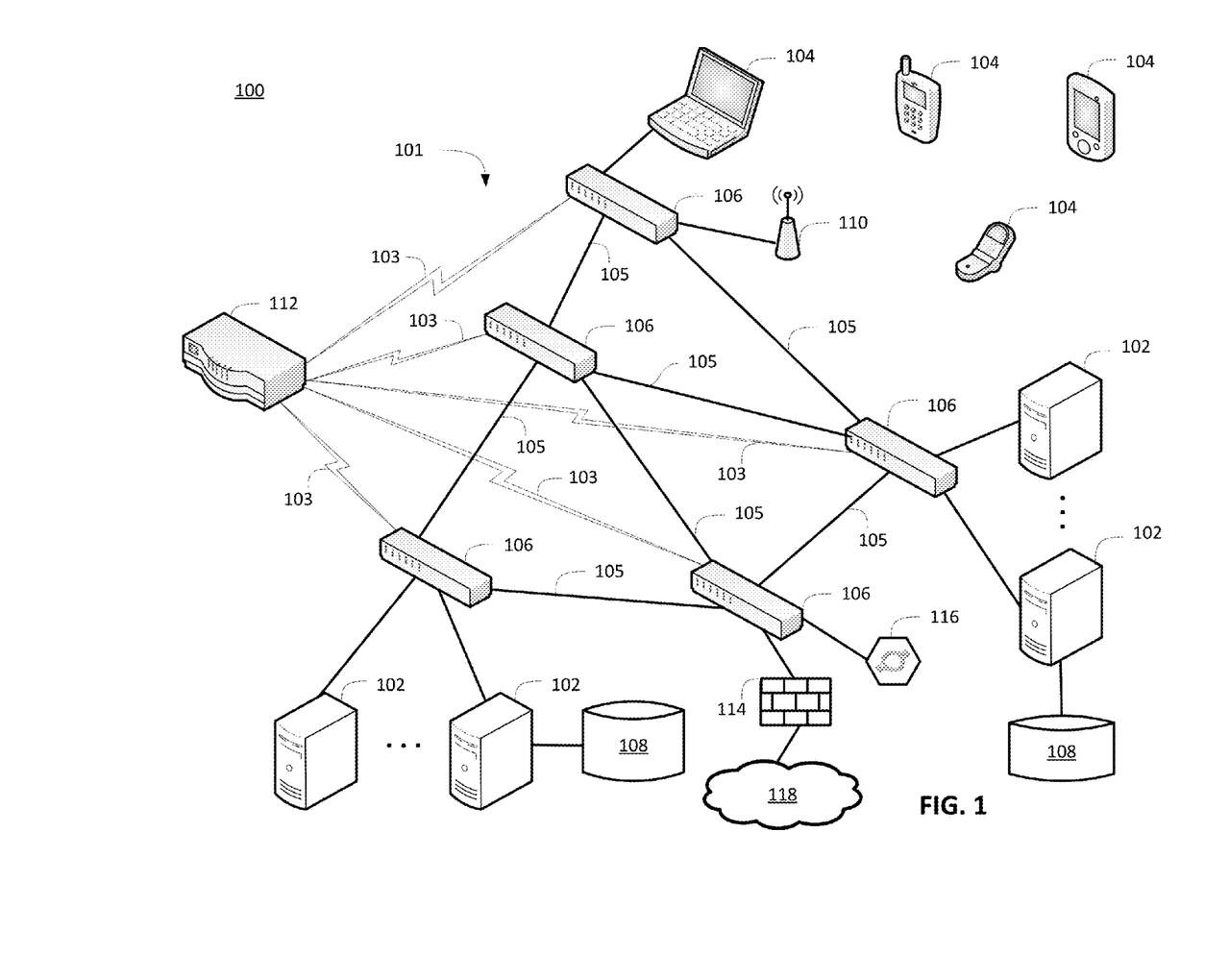
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may comprise one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. For example, each of the links 105 depicted in the network 101 can include more than one physical link. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
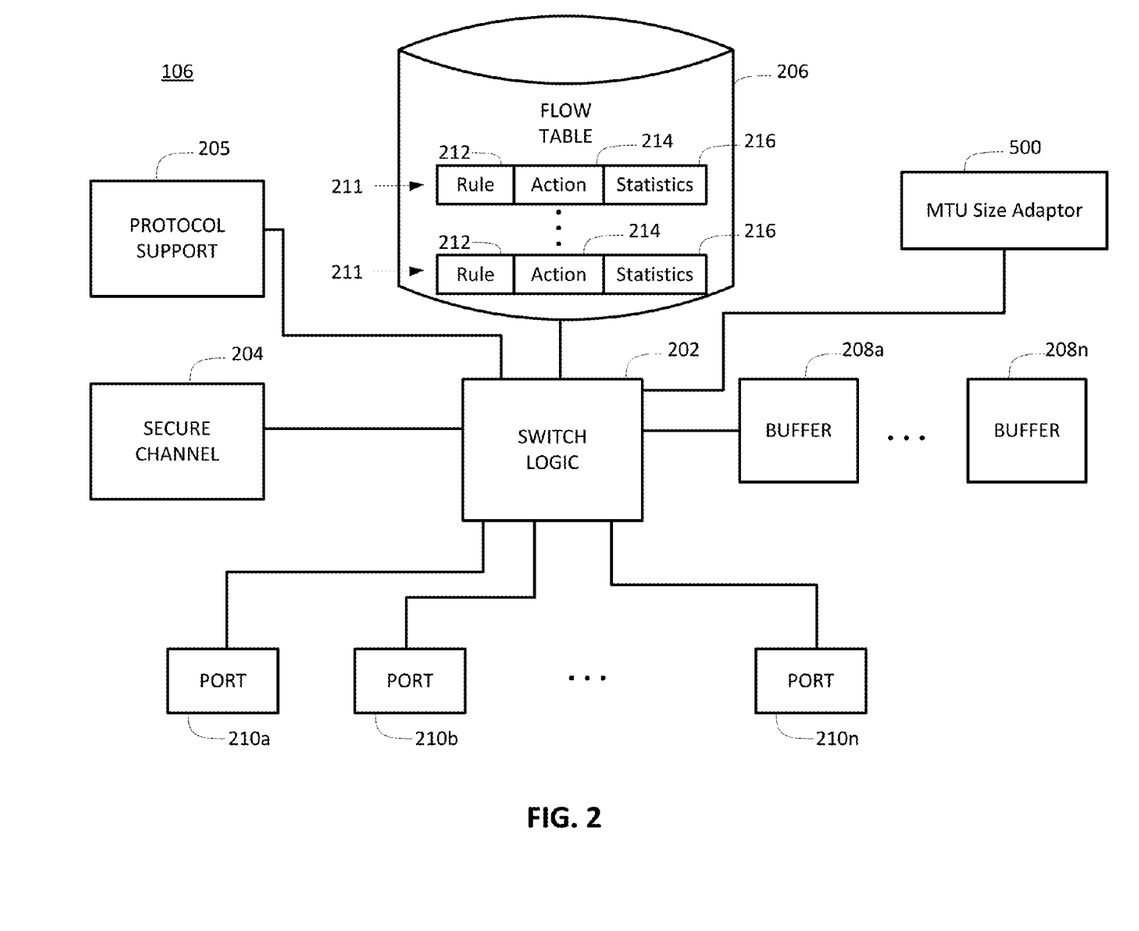
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, buffers 208a-208n, and ports 210a-210n. The switch 106 can also include an MTU size adaptor 500 as further described in reference to FIG. 5. Alternatively, the MTU size adaptor 500 can be included in whole or in part within the network controller 112 of FIG. 1. The switch logic 202 and/or the MTU size adaptor 500 may be implemented in one or more processing circuits, where a computer readable storage medium is configured to hold instructions for the switch logic 202 and/or the MTU size adaptor 500, as well as various variables and constants to support operation of the switch 106. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports. A flow may be defined as all packets that match a particular header format. Each entry 211 in the flow table 206 can include one or more rules 212, actions 214, and statistics 216 associated with a particular flow. The rules 212 define each flow and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in queues for flows as packets are sent between the ports 210a-210n. In a lossless configuration, rather than dropping packets when network congestion is present, the buffers 208a-208n temporarily store packets until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106.

Figure 3:
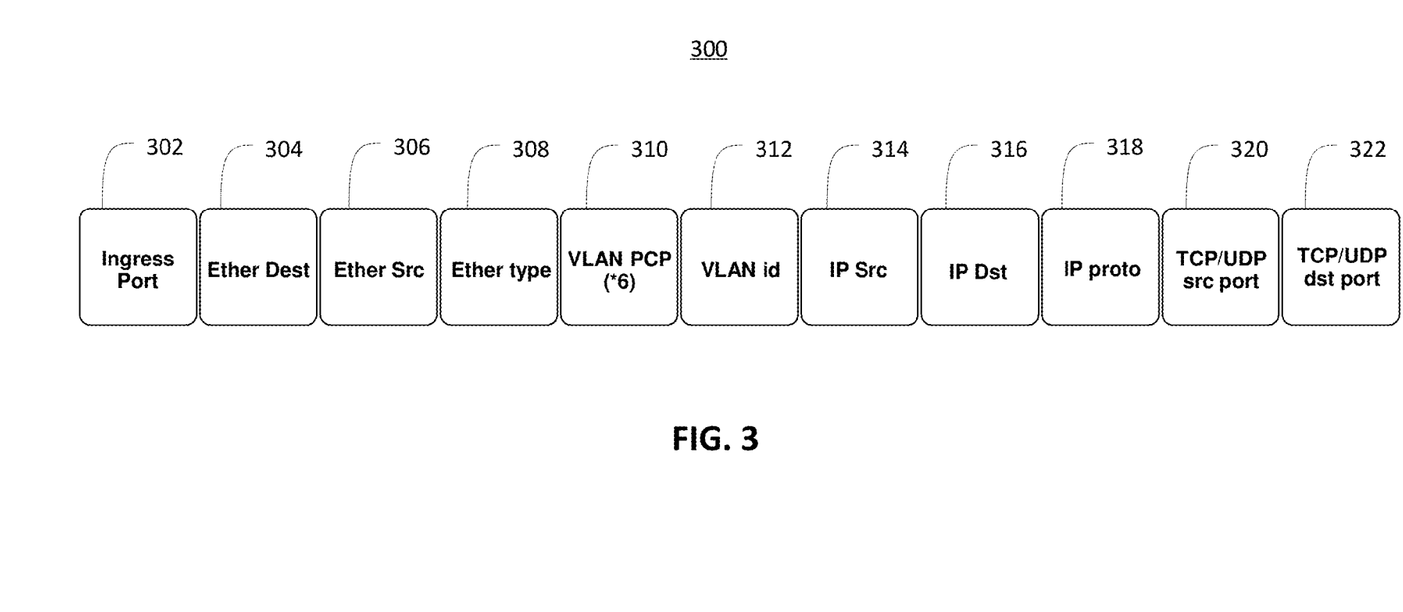
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is an example flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
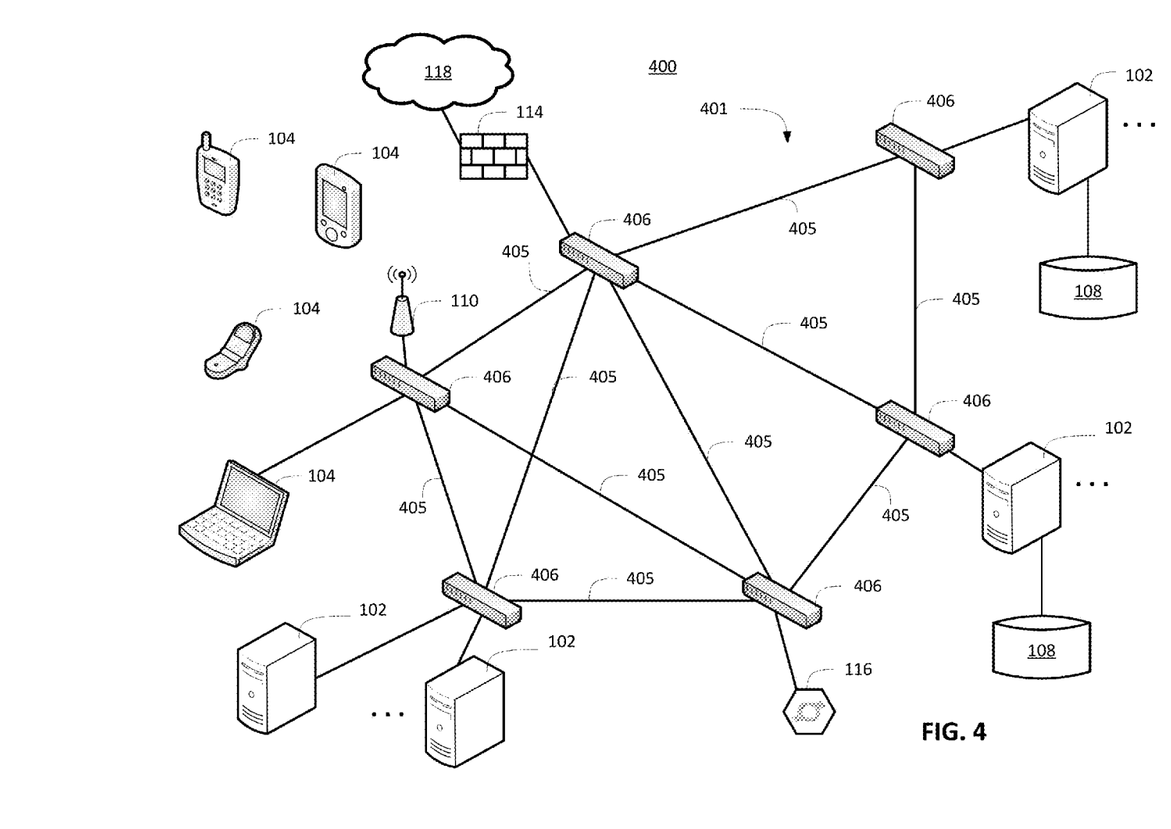
FIG. 4 depicts a block diagram of a system including a network of switches that may be implemented according to an embodiment.

FIG. 4 depicts a block diagram of a system 400 including a network 401 of switches 406 that may be implemented according to an embodiment. Similar to the system 100 of FIG. 1, the system 400 includes a plurality of servers 102 and client systems 104 configured to communicate over links 405 in the network 401 of switches 406. Each of the links 405 depicted in the network 401 can include more than one physical link. In contrast to the system 100 of FIG. 1, the switches 406 are not OpenFlow-capable. The client systems 104 can be linked directly to one or more of the switches 406 or wirelessly through one or more wireless access points 110. Also similar to the system 100 of FIG. 1, the system 400 includes a plurality of data storage systems 108, one or more load balancers 116, and one or more firewalls 114 to control access to one or more external networks 118.

Rather than include a separate network controller, such as the network controller 112 of FIG. 1, control and routing aspects are handled by one or more of the servers 102, clients 104, or the switches 406. Accordingly, the switches 406 need not include the secure channel 204 of FIG. 2 when control logic is localized within the switches 406. In exemplary embodiments, switches 106 of FIG. 1 and the switches 406 of FIG. 4 include an MTU size adaptor 500 as further described in reference to FIG. 5.

Figure 5:
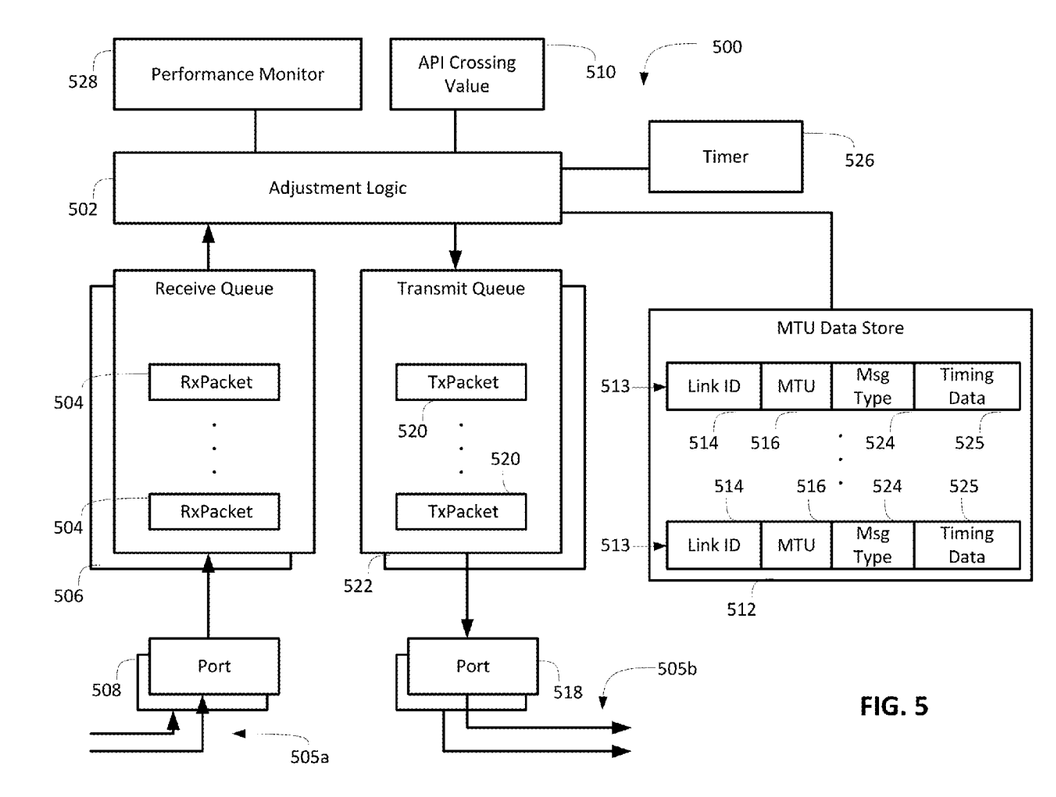
FIG. 5 depicts a block diagram of an MTU size adaptor according to embodiments.

FIG. 5 depicts a block diagram of an MTU size adaptor 500 according to embodiments. The MTU size adaptor 500 includes adjustment logic 502 that analyzes received packets 504 from one or more receive queues 506. The packets 504 are received on one or more links 505a, such as links 105 of FIG. 1 or links 405 of FIG. 4, via ports 508. The adjustment logic 502 can determine an MTU size of each received packet 504 based on the application programming interface (API) crossing value 510 that defines a packet size. The adjustment logic 502 accesses an MTU data store 512 to retrieve information such as an entry 513 that includes link identifier 514 with an associated destination MTU size 516. Header data in the received packets 504 can be used to identify which of the transmit port 518 and associated links 505b should be used to send the received packets 504 as transmit packet 520. The link identifier 514 is associated with a transmit port 518 and link 505b, such as one of the links 105 of FIG. 1 or links 405 of FIG. 4. The adjustment logic 502 can make adjustments to the received packets 504 before placing them in transmit queue 522 as transmit packets 520. For example, if the determined MTU size of a received packet 504 exceeds the associated destination MTU size 516, the adjustment logic 502 can split the received packet 504 into multiple transmit packets 520 such that the transmit packets 520 are smaller than the associated destination MTU size 516.

The MTU data store 512 can include multiple entries 513 for the same link 505b that may be further distinguished by message type 524. For example, command-type messages for a given link 505b can have a smaller associated destination MTU size 516 than data-type messages. The entries 513 in the MTU data store 512 can also include timing data 525. The timing data 525 may be used to sequence a given link 505b between two or more different MTU sizes such that a combination of larger and smaller MTU sizes are used on the link 505b over a period of time. The timing data 525 can indicate a time switching interval and/or a sequence for time division multiplexing MTU size values for an associated link 505b. Accordingly, the adjustment logic 502 may access a timer 526 as a time base for switching MTU sizes per link 505b.

The adjustment logic 502 may also use a performance monitor 528 to monitor links 505b for congestion, utilization, retransmission rate and trending. Identified trends of links 505b becoming slower, over utilized, or more error prone, may result in the adjustment logic 502 reducing the associated destination MTU size 516. Likewise, as a monitored link 505b becomes less congested, less utilized, or more reliable, the adjustment logic 502 may increase the associated destination MTU size 516 toward a maximum supported size for the link 505b.

Each of the links 505a and 505b can include multiple physical links. Accordingly, a received packet 504 may be routed to a target destination (i.e., a next hop location) in the associated network of the MTU size adaptor 500 based on determining a best matching MTU value from the associated destination MTU sizes 516 if multiple physical links are coupled to the same target destination. For example, if a link 505b between a switch containing the MTU size adaptor 500 includes a pair of physical links to a same target destination, where the first physical link has an associated destination MTU size 516 of 1500 bytes and the second physical link has an associated destination MTU size 516 of 9 kbytes, the adjustment logic 502 can use this information to match a routing decision for a received packet 504 based on its determined MTU size.

Figure 6:
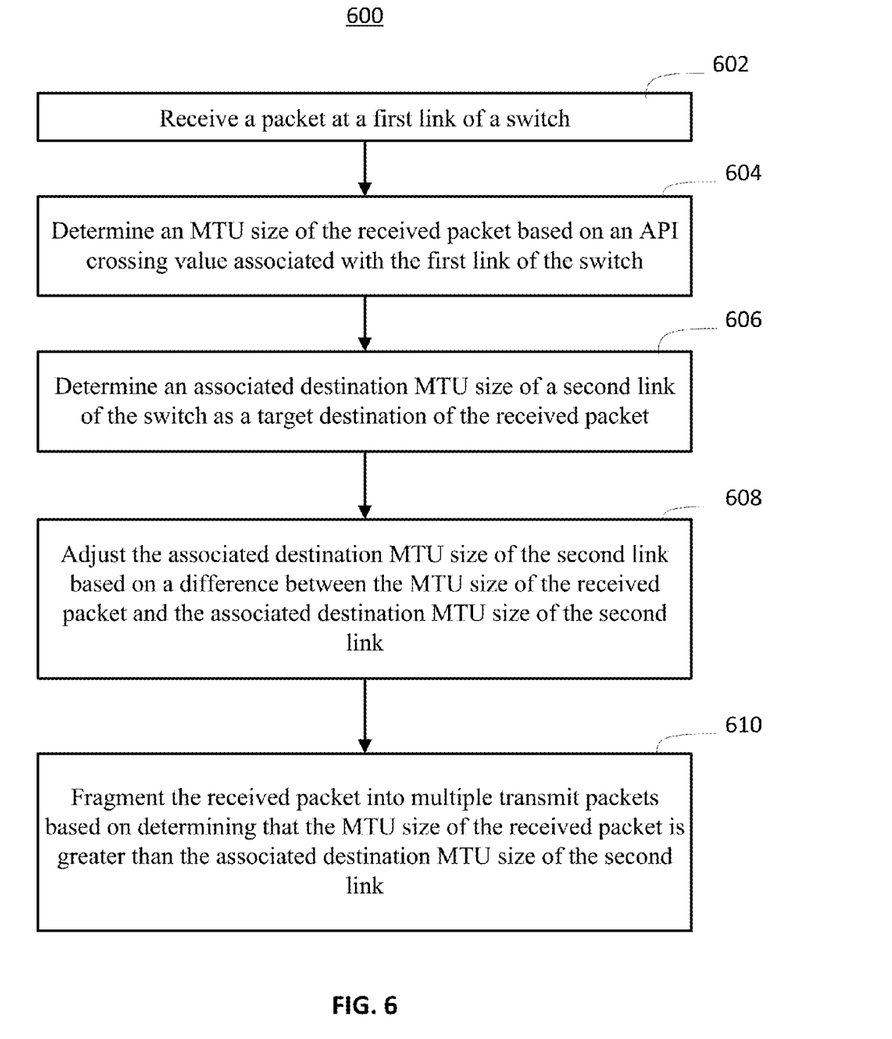
FIG. 6 depicts a flow diagram of a process for dynamically adapting an MTU size according to embodiments.

Turning now to FIG. 6, a flow diagram of a process 600 for dynamically adapting an MTU size in a computer network will be described in an exemplary embodiment. The process 600 is described in reference to FIGS. 1-5 and can be implemented by the system 100 of FIG. 1 and/or the system 400 of FIG. 4. For purposes of explanation, the following example is provided primarily in view of the system 100 of FIG. 1 and the MTU size adaptor 500 of FIG. 5.

At block 602, a packet 504 is received at a first link 505*a* of a switch 106 of the computer network 101. At block 604, an MTU size of the received packet 504 is determined based on an API crossing value 510 associated with the first link 505*a* of the switch 106. At block 606, an associated destination MTU size 516 of a second link 505*b* of the switch 106 is determined, where the second link 505*b* is a target destination of the received packet 504.

At block 608, the associated destination MTU size 516 of the second link 505*b* is adjusted based on a difference between the MTU size of the received packet 504 and the associated destination MTU size 516 of the second link 505*b*. Adjusting can include reducing the associated destination MTU size 516 of the second link 505*b* based on determining that the MTU size of the received packet 504 is less than the associated destination MTU size 516 of the second link 505*b*. If the second link 505*b* can support a larger MTU size, the associated destination MTU size 516 of the second link 505*b* may be increased to match the MTU size of the received packet 504.

MTU size adjustments can also be based on message type 524, where a message type 524 of the received packet 504 is determined. The associated destination MTU size 516 of the second link 505*b* may be adjusted lower based on determining that the message type 524 is a control message type, and the associated destination MTU size 516 of the second link 505*b* may be adjusted higher based on determining that the message type 524 is a data message type.

Time-based MTU size adjustments can also or alternatively be performed. For example, time division multiplexing on the second link 505*b* can be performed by adjusting the associated destination MTU size 516 of the second link 505*b* between different sizes based on periods of time. Timing data 525 and timer 526 can support time division multiplexing.

MTU size adjustments can be based on network performance. For example, the performance monitor 528 can monitor network performance at the switch 106. The associated destination MTU size 516 of the second link 505*b* may be adjusted based on the network performance over a period of time to progressively reduce the associated destination MTU size 516 of the second link 505*b* in response to one or more of: an increasing level of congestion for the second link 550*b* and an increasing retransmission rate for the second link 505*b*. The adjustment logic 502 may also progressively increase the associated destination MTU size 516 of the second link 505*b* in response to one or more of: a decreasing level of congestion for the second link 505*b* and a decreasing retransmission rate for the second link 505*b*.

At block 610, the received packet 504 is fragmented into multiple transmit packets 520 based on determining that the MTU size of the received packet 504 is greater than the associated destination MTU size 516 of the second link 505*b*.

In an exemplary embodiment, the second link 505*b* includes a pair physical links having a lower associated destination MTU size 516 and a higher associated destination MTU size 516. The received packet 504 can be routed to the physical link having the lower associated destination MTU size 516 based on determining that the MTU size of the received packet 504 is less than or equal to the lower associated destination MTU size 516. Similarly, the received packet 504 can be routed to the physical link having the higher associated destination MTU size 516 based on determining that the MTU size of the received packet 504 is greater than the lower associated destination MTU size 516.

Technical effects include dynamically adapting network traffic for a maximum transmission unit size in a computer network. Performing MTU size adjustments on a packet basis allows for more efficient network utilization. MTU sizes can be adjusted dynamically between larger and smaller sizes based on packet size, message type, and timing parameters. Additionally, packets can be split locally within a network switch to match MTU constraints of particular links.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method for dynamically adapting a maximum transmission unit (MTU) size in a computer network, comprising:
   receiving a packet at a first link of a switch of the computer network;
   determining, by an MTU size adaptor of the switch, a message type of the received packet;
   determining, by the MTU size adaptor of the switch, an MTU size of the received packet based on an application programming interface (API) crossing value associated with the first link of the switch;
   determining, by the MTU size adaptor of the switch, an associated destination MTU size of a second link of the switch as a target destination of the received packet;
   decreasing, by the MTU size adaptor of the switch, the associated destination MTU size of the second link based on determining that the message type is a control message type;
   increasing, by the MTU size adaptor of the switch, the associated destination MTU size of the second link based on determining that the message type is a data message type; and
   adjusting, by the MTU size adaptor of the switch, the associated destination MTU size of the second link based on a difference between the MTU size of the received packet and the associated destination MTU size of the second link.

2. The method of claim 1, wherein adjusting the associated destination MTU size of the second link further comprises:
   reducing the associated destination MTU size of the second link based on determining that the MTU size of the received packet is less than the associated destination MTU size of the second link.

3. The method of claim 1, further comprising:
fragmenting the received packet into multiple transmit packets based on determining that the MTU size of the received packet is greater than the associated destination MTU size of the second link.

4. The method of claim 1, further comprising:
performing time division multiplexing on the second link by adjusting the associated destination MTU size of the second link between different sizes based on periods of time.

5. The method of claim 1, wherein the second link comprises a pair physical links including a lower associated destination MTU size and a higher associated destination MTU size, and further comprising:
routing the received packet to the physical link having the lower associated destination MTU size based on determining that the MTU size of the received packet is less than or equal to the lower associated destination MTU size; and
routing the received packet to the physical link having the higher associated destination MTU size based on determining that the MTU size of the received packet is greater than the lower associated destination MTU size.

6. The method of claim 1, further comprising:
monitoring network performance at the switch;
adjusting the associated destination MTU size of the second link based on the network performance over a period of time to progressively reduce the associated destination MTU size of the second link in response to one or more of: an increasing level of congestion for the second link and an increasing retransmission rate for the second link; and
progressively increasing the associated destination MTU size of the second link in response to one or more of: a decreasing level of congestion for the second link and a decreasing retransmission rate for the second link.

7. A computer program product for dynamically adapting a maximum transmission unit (MTU) size in a computer network, the computer program product comprising:
a non-transitory storage medium readable by a processing circuit and storing instructions for execution by the processing circuit for performing a method comprising:
receiving a packet at a first link of a switch of the computer network;
determining, by an MTU size adaptor of the switch, a message type of the received packet;
determining, by the MTU size adaptor of the switch, an MTU size of the received packet based on an application programming interface (API) crossing value associated with the first link of the switch;
determining, by the MTU size adaptor of the switch, an associated destination MTU size of a second link of the switch as a target destination of the received packet;
decreasing, by the MTU size adaptor of the switch, the associated destination MTU size of the second link based on determining that the message type is a control message type;
increasing, by the MTU size adaptor of the switch, the associated destination MTU size of the second link based on determining that the message type is a data message type; and
adjusting, by the MTU size adaptor of the switch, the associated destination MTU size of the second link based on a difference between the MTU size of the received packet and the associated destination MTU size of the second link.

8. The computer program product of claim 7, wherein adjusting the associated destination MTU size of the second link further comprises reducing the associated destination MTU size of the second link based on determining that the MTU size of the received packet is less than the associated destination MTU size of the second link; and further comprising:
fragmenting the received packet into multiple transmit packets based on determining that the MTU size of the received packet is greater than the associated destination MTU size of the second link.

9. The computer program product of claim 7, further comprising:
performing time division multiplexing on the second link by adjusting the associated destination MTU size of the second link between different sizes based on periods of time.

10. The computer program product of claim 7, wherein the second link comprises a pair physical links including a lower associated destination MTU size and a higher associated destination MTU size, and further comprising:
routing the received packet to the physical link having the lower associated destination MTU size based on determining that the MTU size of the received packet is less than or equal to the lower associated destination MTU size; and
routing the received packet to the physical link having the higher associated destination MTU size based on determining that the MTU size of the received packet is greater than the lower associated destination MTU size.

11. The computer program product of claim 7, further comprising:
monitoring network performance at the switch;
adjusting the associated destination MTU size of the second link based on the network performance over a period of time to progressively reduce the associated destination MTU size of the second link in response to one or more of: an increasing level of congestion for the second link and an increasing retransmission rate for the second link; and
progressively increasing the associated destination MTU size of the second link in response to one or more of: a decreasing level of congestion for the second link and a decreasing retransmission rate for the second link.

12. A method for dynamically adapting a maximum transmission unit (MTU) size in a computer network, comprising:
receiving a packet at a first link of a switch of the computer network;
determining, by an MTU size adaptor of the switch, an MTU size of the received packet based on an application programming interface (API) crossing value associated with the first link of the switch;
determining, by the MTU size adaptor of the switch, an associated destination MTU size of a second link of the switch as a target destination of the received packet;
adjusting, by the MTU size adaptor of the switch, the associated destination MTU size of the second link based on a difference between the MTU size of the received packet and the associated destination MTU size of the second link, wherein the second link comprises a pair physical links including a lower associated destination MTU size and a higher associated destination MTU size;

routing the received packet to the physical link having the lower associated destination MTU size based on determining that the MTU size of the received packet is less than or equal to the lower associated destination MTU size; and routing the received packet to the physical link having the higher associated destination MTU size based on determining that the MTU size of the received packet is greater than the lower associated destination MTU size.

13. The method of claim 12, wherein adjusting the associated destination MTU size of the second link further comprises reducing the associated destination MTU size of the second link based on determining that the MTU size of the received packet is less than the associated destination MTU size of the second link; and further comprising:

fragmenting the received packet into multiple transmit packets based on determining that the MTU size of the received packet is greater than the associated destination MTU size of the second link.

14. The method of claim 12, wherein the computer network is a converged Ethernet network.

15. The method of claim 12, further comprising:

determining a message type of the received packet;

decreasing the associated destination MTU size of the second link based on determining that the message type is a control message type; and increasing the associated destination MTU size of the second link based on determining that the message type is a data message type.

16. The method of claim 12, further comprising:

performing time division multiplexing on the second link by adjusting the associated destination MTU size of the second link between different sizes based on periods of time.

17. The method of claim 12, further comprising:

monitoring network performance at the switch;

adjusting the associated destination MTU size of the second link based on the network performance over a period of time to progressively reduce the associated destination MTU size of the second link in response to one or more of: an increasing level of congestion for the second link and an increasing retransmission rate for the second link; and progressively increasing the associated destination MTU size of the second link in response to one or more of: a decreasing level of congestion for the second link and a decreasing retransmission rate for the second link.

* * * * *